United States Patent
Caipa et al.

(10) Patent No.: US 8,532,274 B2
(45) Date of Patent: Sep. 10, 2013

(54) SYSTEM AND METHOD FOR PROVIDING LIMITED UNIQUE TELEPHONE NUMBERS TO ACCESS MULTIPLE LONG DISTANCE DESTINATIONS

(75) Inventors: Alejandro J Caipa, Dunwoody, GA (US); Victor Antonio Trevino, Mexico City (MX)

(73) Assignee: Amerimex Communications Corp, Roswell, GA (US)

( * ) Notice: Subject to any disclaimer, the term of this patent is extended or adjusted under 35 U.S.C. 154(b) by 302 days.

(21) Appl. No.: 12/955,201

(22) Filed: Nov. 29, 2010

(65) Prior Publication Data

US 2012/0134486 A1    May 31, 2012

(51) Int. Cl.
*H04M 15/00*   (2006.01)

(52) U.S. Cl.
USPC .................................. 379/114.2; 379/221.02

(58) Field of Classification Search
USPC ............... 379/114.15, 114.17, 114.2, 114.26, 379/221.01, 221.02
See application file for complete search history.

(56) References Cited

U.S. PATENT DOCUMENTS

| | | | |
|---|---|---|---|
| 5,764,749 A | 6/1998 | Zelazny et al. | |
| 6,069,945 A | 5/2000 | Brown et al. | |
| 6,137,877 A | 10/2000 | Robin et al. | |
| 6,647,112 B2 | 11/2003 | Smith | |
| 7,096,043 B1 * | 8/2006 | Sylvain | 455/565 |
| 7,894,587 B1 * | 2/2011 | Laurinavichus | 379/207.14 |
| 2003/0087639 A1 | 5/2003 | Barak | |
| 2005/0176411 A1 | 8/2005 | Taya et al. | |
| 2007/0087753 A1 | 4/2007 | Rosenblatt et al. | |
| 2008/0037729 A1 | 2/2008 | Mobin et al. | |
| 2008/0123835 A1 | 5/2008 | Fischler | |
| 2009/0016519 A1 | 1/2009 | Bedingfield, Sr. et al. | |
| 2010/0227604 A1 * | 9/2010 | Hsieh | 455/418 |

* cited by examiner

*Primary Examiner* — Antim Shah
(74) *Attorney, Agent, or Firm* — Baker Donelson; Dorian B. Kennedy

(57) ABSTRACT

A method and system (10) is provided for making a domestic or international long distance call through the dialing of a local number. The system includes a telephone which is connected to a traditional Public Switched Telephone Network (13) which is coupled to a softswitch (15). The system also includes a data switch (18), a session border controller (19), a prepaid database (20), a series of call processors (22), and a web interface (23). The session border controller is coupled to an outgoing call connection through the public internet (24). The softswitch provides local access numbers (31) that callers will use to get into the system. The system and method combines the user's telephone number (37) with the local access number to generate a unique sequence (39) which is then found in the database and correlated to a desired long distance number 36 to which the caller is ultimately connected.

9 Claims, 3 Drawing Sheets

FIG. 2

| Telephone Number Caller A | Local Access Number | Internal Code | Unique Sequence | Desired Long Distance Number |
|---|---|---|---|---|
| 678.555.8705 | 678.255.8001 | 1331 | 1331.678.555.8705 | 011.27.21551.2651 |
| 678.555.8705 | 678.255.8002 | 1332 | 1332.678.555.8705 | 011.32.22222.3131 |
| 678.555.8705 | 678.255.8003 | 1333 | 1333.678.555.8705 | 011.21.33310.0101 |
| 678.555.8705 | 678.255.8004 | 1334 | 1334.678.555.8705 | 011.27.21121.1423 |
| 678.555.8705 | 678.255.8005 | 1335 | 1335.678.555.8705 | 011.31.11122.1212 |
| Caller B | | | | |
| 678.422.6343 | 675.255.8001 | 1331 | 1331.678.422.6343 | 011.42.44444.2211 |
| 678.422.6343 | 675.255.8002 | 1332 | 1332.678.422.6343 | 011.41.00012.2101 |
| 678.422.6343 | 675.255.8003 | 1333 | 1333.678.422.6343 | 011.21.98836.3402 |
| . . . | . . . | . . . | | |

FIG. 3

SYSTEM AND METHOD FOR PROVIDING LIMITED UNIQUE TELEPHONE NUMBERS TO ACCESS MULTIPLE LONG DISTANCE DESTINATIONS

TECHNICAL FIELD

This invention is related to a system and method of providing long distance telephone services and, specifically to a system and method of providing limited unique telephone numbers to access multiple long distance destinations.

BACKGROUND OF THE INVENTION

A global economy combined with immigration patterns and a strong advance in telecommunications technologies has created a growing demand for long distance and international telephone communications. Many consumers now have a wide range of options to communicate with their peers, families or friends. Wireless or cellular telephones have been used by a very large number of consumers in the market. This means a person is often communicating nationally and internationally through a cellular phone network. Most of the cellular carriers within the United States of America include a calling plan which includes continental long distance traffic at no extra cost. However, these carriers typically do not provide competitive pricing for international calling. When making an international call, the cellular carrier typically charges the caller a rather expensive per minute usage or toll fee.

Because of the increased demands for less expensive and better telecommunications services a lot of mechanisms have been implemented with the objective of cutting costs and improving the call experience. Technologies like voice over internet protocol (VoIP) and especially voice over internet protocols such as session initiation protocol (SIP) permits new carriers to offer the same benefit as the traditional incumbent carriers with less capital expenses. Even traditional telephone companies are expanding the available range of products and lowering their prices to keep themselves competitive in the market place.

The traditional telecommunications industry provides many ways to communicate internationally. These include dialing directly from a business phone, residential phone or from a cell phone. However, the rates for these types of calls are relatively expensive due to their usage fees.

Another method of making international calls has been through the use of calling cards. The calling card provides for a method to "dial around" the traditional or incumbent carrier. The calling card allows users to place calls from any telephone in the United States of America to any international destination and the calling card is used to pay for the call. The traditional carrier is in effect "by passed" or "dialed around". Cards offer competitive rates and similar quality as the direct dial method. However, these calling cards require a lengthy process to initially make or place the call. A person is typically required to dial the telecom switch access number of the calling card provider and then enter a personal identification number (PIN) before entering the desired international destination number. As a result, the person may have to dial more than 35 digits in order to place a single call. These calling cards provide a less expensive solution but are tedious to utilize.

Accordingly, there is a need for a system where a person can dial around their incumbent carrier and call an international destination number just as quickly and easily as directly dialing the number and without incurring an international call usage fee from the incumbent carrier. It is to the provision of such therefore that the present invention is primarily directed.

SUMMARY OF THE INVENTION

In a preferred form of the invention, a telephone system comprises a public switch telephone network including an automatic number identification means for automatically generating a caller's telephone number and means for identifying a local access number dialed by a user and a softswitch coupled to the public switch telephone network. The softswitch has combining means for combining the caller's telephone number identified by the automatic number identification means with the local access number identified by the local access number means to form a unique sequence. The system also has a database coupled to the softswitch for storing a plurality of unique sequence entries and a plurality of desired long distance number entries, each unique sequence entry being correlated with one desired long distance number entry. The database includes comparing means for comparing a unique sequence generated by the softswitch to the plurality of unique sequence entries to obtain a matching unique sequence entry and returning a stored desired long distance number entry related to the matching stored unique sequence entry. The system also includes at least one call processor and an outgoing call connection coupled to softswitch.

In another preferred form of the invention, a method of placing a long distance call comprising the steps of (A) providing a telephone system with a database platform and coupling the telephone system to a public switch telephone network having an automatic number identifier; (B) storing a unique identifier entries associated with a caller's telephone number and a local access number within the telephone system database platform; (C) storing desired long distance number entries within the telephone switch database and correlating each stored desired long distance number entry with a stored unique identifier entry; (D) placing a call to the public switch telephone network wherein the automatic number identifier generates the caller's telephone number and transfers the caller's telephone number to the telephone system; (E) combining the caller's telephone number with the local access number utilized by the caller to create a unique identifier; (F) comparing the unique identifier with the unique identifier entries stored within the telephone system, database platform and identifying any matching unique identifier entry, and (G) correlating the desired long distance number entry with the matching unique identifier entry and utilizing the correlating desired long distance number entry to transfer the call to an long distance carrier.

BRIEF DESCRIPTION OF THE DRAWING

FIG. 2 is an illustration of the graphical interface of the telephone system of FIG. 1.

FIG. 3 is a table showing the correlation between inputted data contained within the database of the telephone system of FIG. 1.

DETAILED DESCRIPTION

Figure 1:
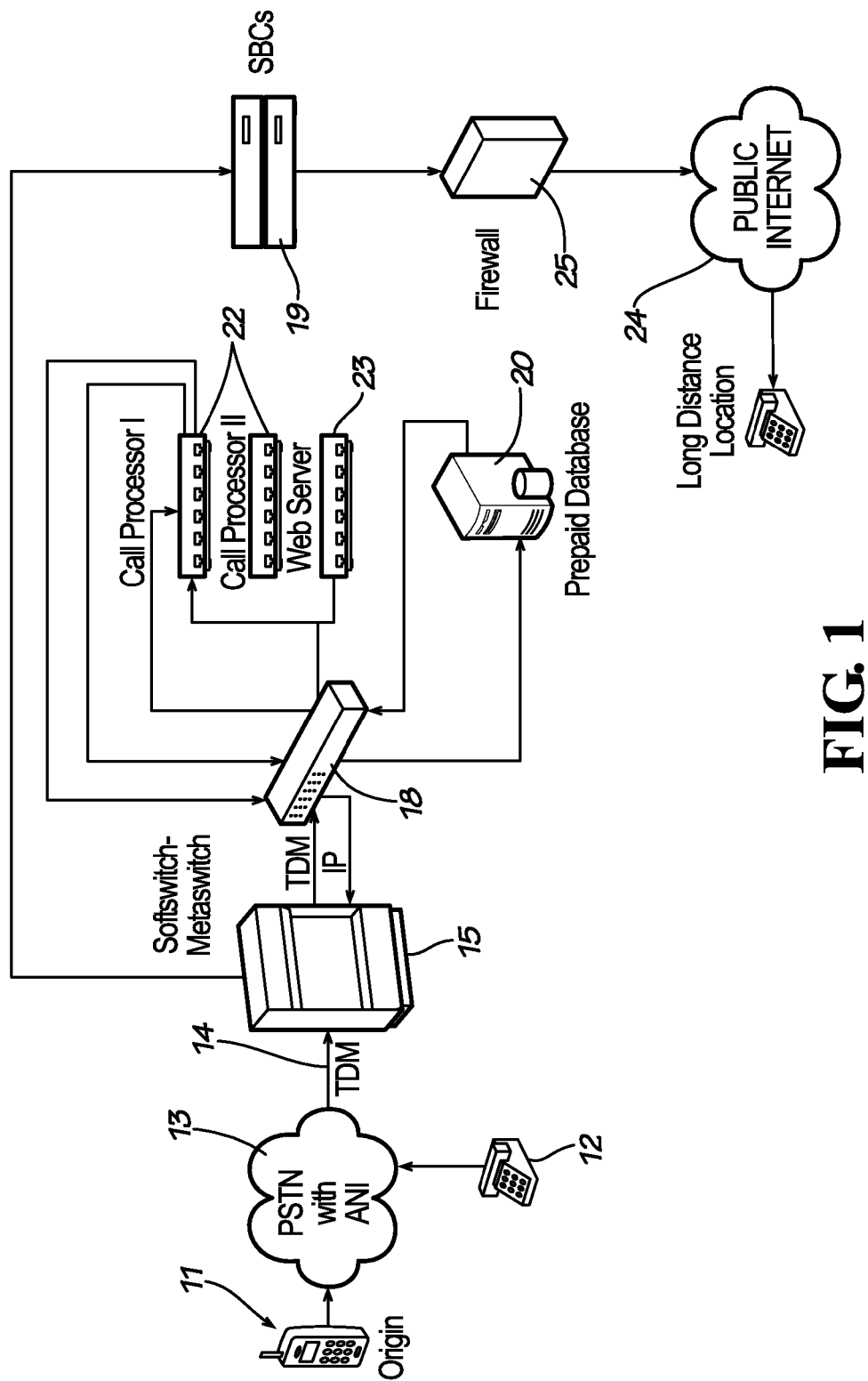
FIG. 1 is a schematic view of the telephone system embodying principles of the invention in a preferred form.

With reference next to the drawings, there is shown a method and system 10 to provide an easy and convenient way to make less expensive international or long distance calls through the dialing of a local number.

FIG. 1 schematically shows the system 10 for making a long distance or international call using either a wireless telephone 11 or a landline telephone 12. Both the wireless telephone 11 and the landline telephone 12 connect to a traditional Public Switched Telephone Network 13 (PSTN). The PSTN 13 connects to the system 10 through time division multiplex (TMD) protocol by a DS3 type connector 14. The PSTN 13 connects through the DS3 connector 14 to the system's softswitch 15. The softswitch 15 is coupled to a data switch 18 and a session border controller 19 (SBC). The data switch 18 is coupled to a prepaid database or debit platform 20, a series of call processors 22, and a web interface 23. The SBC 19 is coupled externally to an outgoing call connection in the form of the public Internet 24 through a firewall 25. The softswitch 15 connects different types of digital media stream together to create an end-to-end path for the media (voice and data) in the call. The softswitch 15 also provides all the local access numbers that callers will use to get into the system and place their calls.

In detail and by means of example only, the system 10 may utilize the following components which are generally available at the present time. The softswitch 15 may be a Metaswitch VP3510 made by Metaswitch Networks of Enfield, U.K. The prepaid database 20 may be a Dell Power Edge R905, made by Dell, Inc. of Round Rock, Tex., using an Opteron 8350 processor at 2 GHz, 560 Gb HD and 32 Gb of RAM using Windows Server 2003, 2008 or higher and Microsoft SQL Server 2008. The call processor 22 may be a Dell Power Edge 851 utilizing a Pentium IV processor at 2.8 GHz, 2×16 Gb HD, 2 Gb of RAM and a Dell Power Edge 850 utilizing a Pentium IV processor at 2.8 GHz, 2×16 Gb HD, 2 Gb of RAM each using Windows Server 2003, 2008 or higher and Microsoft SQL Server 2008. The web interface 23 may be a Dell Power Edge 850 utilizing a Pentium IV processor at 2.8 GHz, 2×16 Gb HD, 2 Gb of RAM using Windows Server 2003, 2008 or higher and Microsoft SQL Server 2008. The data switch 18 may be a 3Com 3824 (24 port 10/100/1000 Gigabit Ethernet as a managed gigabit switch, made by 3Com Corporation of Santa Clara, Calif. The SBCs 19 may be a Ditech PeerPoint C100 which is able to handle IP transit, IP origination/termination and SIP sessions, made by Ditech Networks, Inc. Of Mountain View, Calif. The firewall 25 may be a Cisco PIX 506E, made by Cisco Systems, Inc. of San Jose, Calif.

Figure 2:
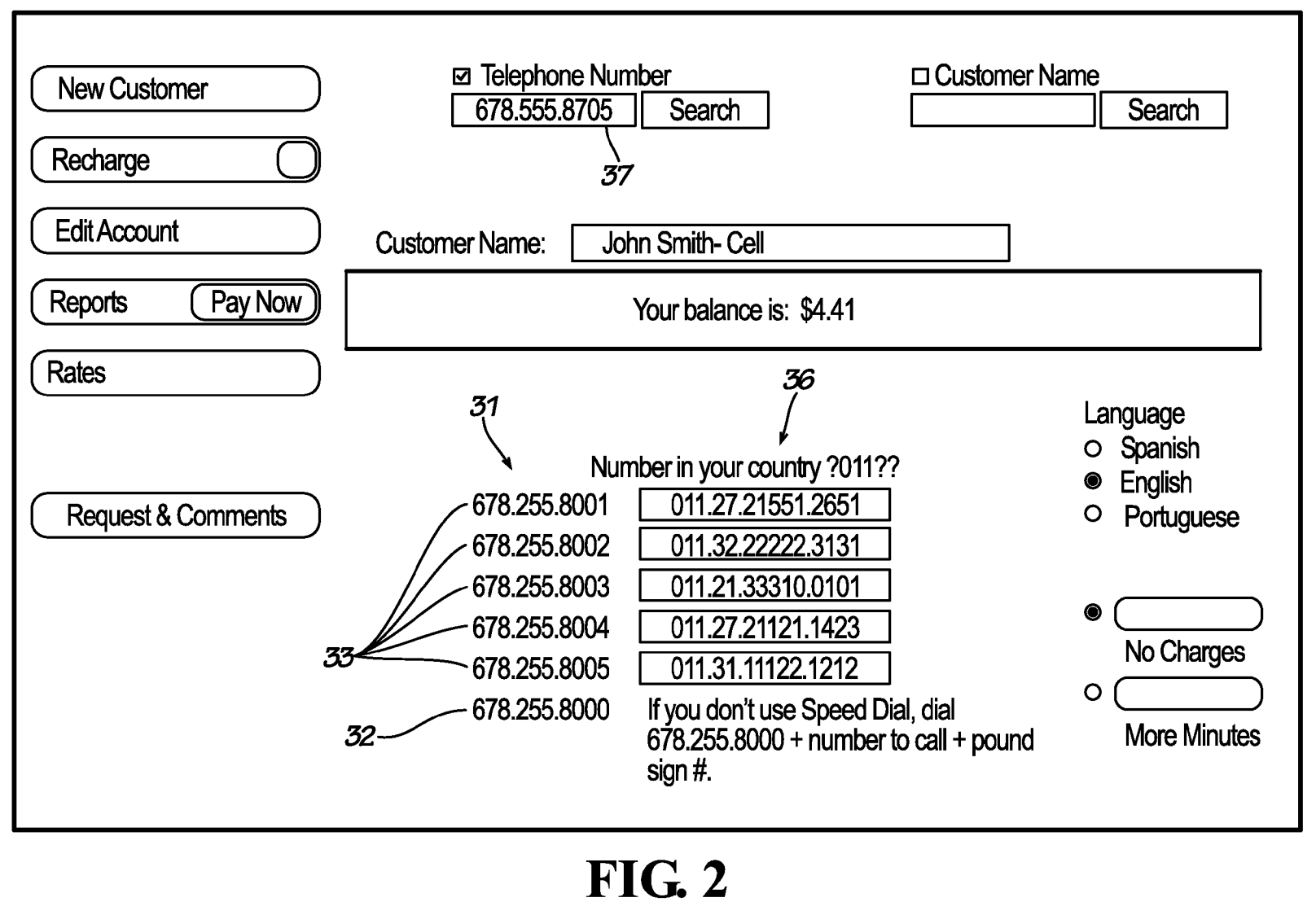

The system 10 utilizes local access numbers 31 which are local telephone numbers to the area where the softswitch is located so that a caller is placing a "local" call without incurring long distance or toll charges in doing so. As shown in FIG. 2, two types of local access numbers 31 are provided on the softswitch. The first type of local access number is referred to herein as a general local access number 32 and is shown as example local telephone number 678.255.8000. The second type of access number is a preprogrammed or speed dial local access numbers 33 and is shown as example preprogrammed local numbers 678.255.8001; 678.255.8002; 678.255.8003; 678.255.8004 and 678.255.8005. The general local access number 32 allows the callers to dial the local access number 32 and ultimately enter manually the desired long distance number 36 using their calling device's (telephone) manually articulated dial pad, the ultimate destination or desired long distance numbers 36 are then transmitted to the system through the dial pad using dial tone multi-frequency (DTMF). Preprogrammed local access numbers 33 permit the caller to by-pass the process of manually entering the ultimate destination or desired long distance number 36 and instead allows the preprogrammed local access number 31 to be automatically converted to a unique sequence entry and correlated to a desired long distance number entry in the database that is associated with the preprogrammed local access number 33. These preprogrammed local access numbers 33 may be associated with preprogrammed or speed dial entries one through five on the customer database, as indicated by the last digit of each of the five local access numbers. It should be understood that all callers within a local geographic or calling zone area use the same preprogrammed access numbers 33 and general access number 32 to dial their own ultimate destination or desired long distance number 36. Even though callers are dialing the same local telephone number (access number 31) to enter into the system, each call is ultimately terminated in or transferred to different ultimate destination or desired long distance numbers 36 based on the caller's pre-populated entries into the prepaid database 20. The softswitch 15 is also interconnected via session initiation protocol (SIP) bindings with different long distance carriers that transfer or terminate traffic worldwide, i.e., transfer the call to an international carrier.

The debit platform or prepaid database 20 contains all caller related information and keeps all the billing information that in conjunction with the softswitch completes the call, as described in more detail hereinafter. The prepaid database 20 validates the account by using ANI (automatic number identification) recognition to recognize the caller through the caller's telephone number 37. Traffic information like date, time, destination and duration of the calls is stored in a database table and are used to create billing records and to keep a history of the account in case a customer or other entity requires the information. Information concerning recharges (placing money into an account) in the accounts is also stored and balances are updated accordingly. All billing transactions have a time stamp on them and are easily accessed by company's customer service representatives or directly by the customers using a web interface. Routing information as well as dialing patterns to terminate traffic are also contained in this platform. The type of calls, average call duration (ACD) and answer supervision ratio (ASR) are used to monitor the network's performance.

The web interface 23 interacts with the callers and allows them to populate or enter all required information into the database platform. In order to use the system the caller's phone number (example: 678.555.8705) is stored in a database platform through the very simple entry to use web-based interface. FIG. 2 shows a representation of the graphical interface. An account is created on the prepaid database using the caller's Caller ID as an ALIAS of the account. In addition, the caller's name, balance and rate plan are also defined. The caller also has the ability to correlate the caller's most used long distance numbers as the caller's desired long distance number 36 (entries) correlating to the caller's preprogrammed local access numbers 33 and hence the unique sequence (entry). Here five entries for preprogrammed or speed dial local access numbers 33 are created and added to the database, each one of those preprogrammed local access numbers is identified in the database with a four digits number or internal code 38 (example: 1331) provided by the softswitch.

The callers may access the system 10 by dialing any of the access numbers 31 using either his wireless or landline phone 11 or 12 that is already registered in the system. The number dialed by the caller (local access number 31) is identified as the destination number identification service (DNIS). The call is then sent from his phone service provider to the PSTN 13. The call is directed to the softswitch 15 based on the local access number 31 dialed by the caller (DNIS), which contains the imbedded internal code 38 to recognize the destination switch (local routing number or LRN). The ANI provided information (caller's telephone number, example 678.555.8705) relating to the caller is also sent to the softswitch 15. Once the call reaches the softswitch 15 the call is converted from a time division multiple (TDM) to SIP and the call is sent to the debit platform/prepaid database 20. Due to this change from this point all calls will be transported inside the network using SIP. In case the caller wants to call one of his speed dial destinations, caller dials one of the preprogrammed local access numbers 33 provided for that purpose. The softswitch translates that number into the internal code 38 and combines it with the ANI that originates the call (caller's telephone number 37) to form a unique sequence 39. The unique sequence 39 is then sent to the prepaid database for comparison against the unique sequence entries stored within the database.

The billing platform looks for or makes a comparison for a match between the combination of the translated internal code 38 and ANI (unique sequence 39) sent by the softswitch and the DNIS ALIAS combination (unique sequence entry) contained within the database. In the case where none of the records on the database match the DNIS ANI combination (unique sequence 39) then the system generates a voice prompt informing that the caller needs to enter the account number, otherwise the account will be validated. The prepaid database checks the balance on the account, if caller's balance is insufficient to place a call then the system gives a voice prompt to the caller providing the caller with information concerning the caller's present monetary balance. Two possible scenarios may occur which depend upon the DNIS dialed by the caller. If the caller dials the general local access number 32 (example: 678.255.8000) i.e., it does not have a speed dial/preprogrammed numbers associated with it, the system will request that the caller to enter a destination or desired long distance number, the caller then sends the telephone number digits through his phone and the local carrier transmits the digits via DTMF to the system. The softswitch 15 then transmits those tones to the prepaid database 20 and the prepaid database in turn looks for rate information, dialing patterns and route carriers in the billing tables. After the prepaid database 20 accomplishes these tasks the call is sent back to the softswitch 15 with specific instructions on which long distance carriers to use and the order to use them to terminate the call. The softswitch then directs the call to the public Internet 24 through the data switch 18 and firewall 25 to complete the call.

The second scenario involves the use of a specific preprogrammed local access number 33 (example: 678.255.8001). Here, after verification of the user as previously described, the system automatically checks the customer's database entries for the preprogrammed local access number previously set up by the caller through the web interface and correlates it with the desired long distance number 36. Once the long distance or desired number 36 is acquired through the database entry then the prepaid platform sends the desired long distance number 36 and the information about the terminating long distance carrier (such as AT&T) back to the softswitch 15. The softswitch then transfers the call via SIP binding to the appropriate long distance carrier which transports the call to the final destination. In this case, the caller is using a local telephone number (preprogrammed local access number 33) that can be easily stored in a wireless phone. Multiple users or callers can dial the same preprogrammed local access number 33 and reach different desired long distance numbers (international destinations). The combination of the caller's telephone number 37 (ANI generated) and the internal code 38 generated by the softswitch 15 once the local access number is dialed is unique and allows the one to many users or callers relationship to exist.

With reference to FIG. 3, there is shown a table illustrating two callers, designed as Caller A and caller B, utilizing the system 10. The first caller's (Caller A) telephone number is 678.555.8705, which will be automatically recognized when calling into the system through ANI and entered. Caller A has preprogrammed the five preprogrammed local access numbers 33, with the first preprogrammed local access number 33 (678.255.8001) being associated with ultimate destination or desired long distance number (entries) 36 (011.27.21551.2651). As such, when the user calls the first preprogrammed local access number 33 (678.255.8001) the system recognizes the caller through the ANI and converts the first preprogrammed access number (678.255.8001) to a four digit internal code 38 (example: 1331). The system combines the four digit internal code 38 with the caller's telephone number 37 (678.555.8705) to form a unique sequence 39 (13316785558705). The system then compares or correlates the unique sequence to information (unique sequence entries) contained within the prepaid database 20 to obtain an ultimate destination or desired long distance number (entries) 36 (011.27.21551.2651). As such, through the caller dialing a local access number 31 (678.255.8001) the call is ultimately placed by the system to the desired long distance number 36 (011.27.21551.2651) without the caller incurring long distances charges or toll charges by their incumbent carrier. The verification portion of the system has not been described in this example to provide a clearer understanding of the conversion process.

It should be understood that for the most part the difference between a caller calling a preprogrammed local access number 33 and a general access number 32 is that the preprogrammed local access numbers 33 have ultimate destination or desired long distance numbers 36 already assigned or correlated with the preprogrammed local access number, while the general local access number 32 does not have such a preprogrammed correlation with preselected long distance numbers. Hence, by utilizing or calling the general local access number 32 the caller may enter any desired long distance number he or she desires to call. As such, the system is not limited to only preprogrammed ultimate or desired long distance numbers and may be utilized to call any long distance number through the systems prompts to the caller during the initiation of the call.

The access of several users utilizing the same local access number 31 is illustrated by further reference to caller B in FIG. 3. Here, Caller B's caller telephone number 37 is exampled as 678.422.6343. While Caller B calls the same preprogrammed local access number 33 (678.255.8001) the system adds internal code 38 (example: 1331) to form unique sequence 13316784226343 and correlates the entries to obtain a desired long distance number 36 as 011.42.44444.2211. Thus, by calling the same local access number Caller A and Caller B obtain different desired long distance numbers 36.

It should be understood that the conversion of the local access number to an internal code is to provide a shorter numeric sequence. The system may also utilize the entire local access number as a portion of the unique sequence, but by doing so the unique sequence would be greater in length. As such, as used herein the actual number and the internal code are considered equivalents with regard to the invention and specifically to the recitation within the claims.

It thus is seen that a telephone system and method of connecting long distance or international calls as a local call is now provided. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. A telephone system comprising:
   a public switch telephone network including an automatic number identification means for automatically generating a caller's telephone number and means for identifying a local access number dialed by a user;
   a softswitch coupled to said public switch telephone network, said softswitch having combining means for combining the caller's telephone number identified by said automatic number identification means with the local access number identified by said local access number means to form a unique sequence;
   a database coupled to said softswitch, said database fixedly storing a plurality of said unique sequence entries and a plurality of desired long distance number entries, each said unique sequence entry being correlated with one fixed said desired long distance number entry, said database including comparing means for comparing a unique sequence generated by said softswitch to said plurality of fixed unique sequence entries to obtain a matching fixed unique sequence entry fixedly stored and returning a fixed stored desired long distance number entry related to the matching said stored unique sequence entry, and said database also includes verification means for verifying that the caller has sufficient credit to place the telephone call;
   at least one call processor coupled to said softswitch, and
   an outgoing call connection coupled to said softswitch which transfers the call to a long distance carrier connected to the public switch telephone network.

2. The telephone system of claim 1 wherein said outgoing call connection is a public internet connection.

3. The telephone system of claim 1 wherein said softswitch converts said local access number identified by said automatic number identification means to an internal code which is combined with said caller's telephone number to form said fixed unique sequence.

4. A method of placing a long distance call comprising the steps of:
   (A) providing a telephone system with a database platform and coupling the telephone system to a public switch telephone network having an automatic number identifier;
   (B) fixedly storing unique identifier entries associated with a caller's telephone number and a fixed local access number within the telephone system database platform;
   (C) fixedly storing desired long distance number entries within the telephone switch database and fixedly correlating each stored desired long distance number entry with a fixed stored unique identifier entry;
   (D) placing a call to the public switch telephone network wherein the automatic number identifier generates the caller's telephone number and transfers the caller's telephone number to the telephone system;
   (E) combining the caller's telephone number with the local access number utilized by the caller to create a unique fixed identifier;
   (F) comparing the unique identifier with the unique fixed identifier entries stored within the telephone system database platform and identifying any matching unique identifier entry,
   (G) correlating the desired long distance number entry with the matching unique fixed identifier entry and transferring the call to a long distance carrier connected to the public switch telephone network utilizing the correlating desired long distance number entry, and
   (H) verifying that the caller's account has sufficient credit prior to transferring the call to the long distance carrier.

5. The method of claim 4 wherein step (G) the call is transferred to a long distance carrier utilizing a public internet connection.

6. The method of claim 4 wherein the caller's telephone number is converted to an internal code which is utilized to create the unique fixed identifier.

7. A method of placing a long distance telephone call comprising the steps of:
   (A) providing a public switch telephone network including an automatic number identification means for automatically generating a caller's telephone number and means for identifying a local access number dialed by a user;
   (B) providing a softswitch coupled to the public switch telephone network;
   (C) providing a database coupled to the softswitch for storing a plurality of fixed unique sequence entries and a plurality of fixed desired long distance number entries, each fixed unique sequence entry being correlated with one fixed desired long distance number entry;
   (D) combining the caller's telephone number identified by the automatic number identification means with the local access number identified by the local access number means to form a fixed unique sequence;
   (E) comparing a unique sequence generated by the softswitch to the plurality of fixed unique sequence entries to obtain a matching fixed unique sequence entry and returning a stored desired long distance number entry related to the matching fixed stored unique sequence entry;
   (F) transferring the call to a long distance carrier connected to the public switch telephone network based upon the returned stored desired long distance number entry, and
   (G) verifying that the caller's account has sufficient credit prior to transferring the call to the long distance carrier.

8. The method of claim 7 wherein step (F) the call is transferred to a long distance carrier utilizing a public internet connection.

9. The method of claim 7 wherein the caller's telephone number is converted to an internal code which is utilized to create the fixed unique identifier.

* * * * *